C. LE G. FORTESCUE.
CIRCUIT INTERRUPTING DEVICE.
APPLICATION FILED JUNE 30, 1915.

1,227,417.

Patented May 22, 1917.

WITNESSES:
R. J. Ridge.
J. H. Procter.

INVENTOR
Charles Le G. Fortescue.
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

CIRCUIT-INTERRUPTING DEVICE.

1,227,417.  Specification of Letters Patent.  Patented May 22, 1917.

Application filed June 30, 1915. Serial No. 37,258.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Circuit-Interrupting Devices, of which the following is a specification.

My invention relates to means for automatically interrupting electrical circuits under predetermined circuit conditions.

One object of my invention is to provide automatic means for interrupting a circuit upon either the occurrence of a short circuit or a gradually increasing overload.

Another object of my invention is to provide means for quickly absorbing or dissipating the energy that tends to traverse the circuit after the same has been interrupted.

My copending U. S. application, Serial No. 850,744, filed July 13, 1914, and assigned to the Westinghouse Electric and Manufacturing Company discloses a means for interrupting an electric circuit by utilizing a mercury valve, the arc of which is adapted to be extinguished by an oscillatory discharge from a condenser that is permanently connected across the circuit. A device of this type operates satisfactorily if the short circuit occurs so quickly that the discharge reverses the direction of flow of energy through the mercury valve. However, to insure more dependable protection, some means must be provided for absorbing the energy that traverses the local circuit containing the condenser when the main circuit is interrupted. Means must also be provided to insure complete protection when the overload is not instantaneous in its occurrence. I provide a mercury valve, a critically damped circuit in permanent shunt connection thereto, a condenser normally connected across the circuit and a relay for connecting the condenser in shunt relation to the mercury valve under predetermined conditions.

Figure 1:
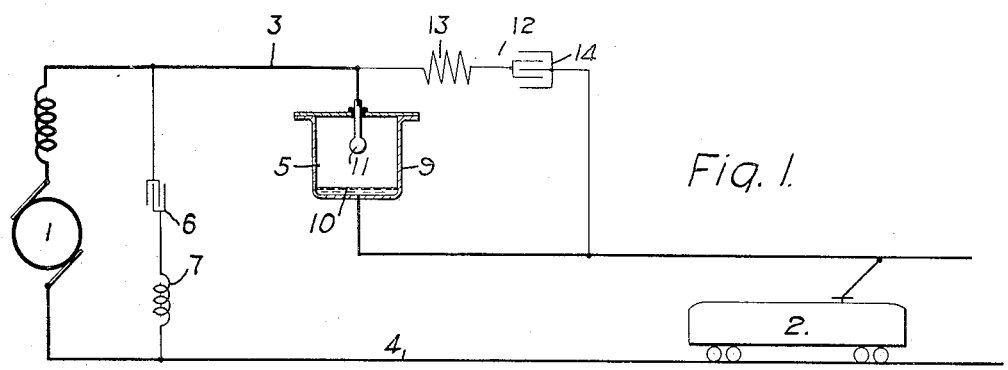
Figure 2:
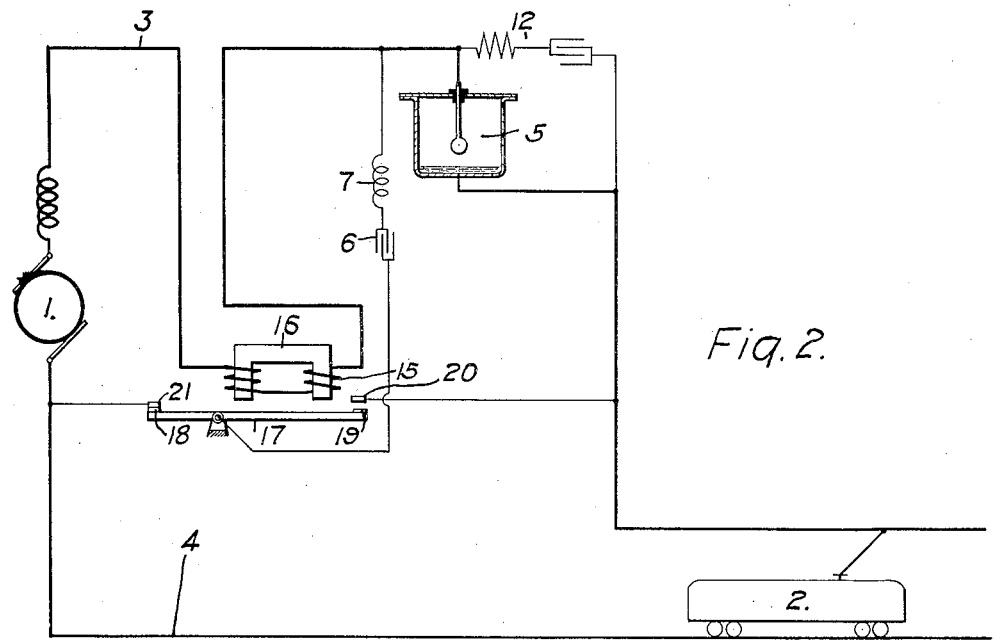

In the accompanying drawing, Figure 1 is a diagrammatic view of circuits and apparatus embodying one form of my invention, and Fig. 2 is a diagrammatic view of circuits and apparatus embodying my complete invention.

In Fig. 1, a direct-current generator 1 supplies current to a load 2 through conductors 3 and 4. A mercury-vapor device 5 is connected in series with the conductor 3, and a condenser 6 and a reactor 7 are connected in series with each other and in shunt relation to the generator 1.

The mercury-vapor device 5 comprises a metal container 9, an anode 11 and a quantity of mercury 10 that serves as the cathode. In order to supply the load 2 with power from the generator 1, an arc must be established in the device 5 by some starting means, (not shown) which will insure a high-voltage discharge from the anode to the cathode. The condenser 6 and the reactor 7 are so proportioned that, when the voltage upon the circuit is quickly changed by a short circuit or other disturbance, the condenser 6 will be charged and will induce or set up an oscillating voltage in the conductors 3 and 4 when it discharges. This oscillating voltage tends to increase the current flow through the mercury valve 5 during the first half wave of its oscillation, but, during the second half wave, it reduces the resultant current to zero. Since the current in a mercury-vapor device cannot reverse in direction, the arc will be extinguished and the circuit will be interrupted.

When the circuit is suddenly interrupted, a large current still traverses the circuit comprising the generator 1, the condenser 6 and the reactor 7. This current represents a large amount of kinetic energy that must necessarily be stored in the condenser 6 in the form of a difference of potential unless some other path is provided for it to travers the main circuit. This difference of potential may be sufficiently high to overcome the cathode resistance of the mercury valve to thus reëstablish the arc or it may break down the insulation of the condenser 6 or that of the generator 1. A path 12 that is critically damped with respect to the valve 5 under normal conditions is connected in shunt relation to the mercury valve 5 for the purpose of dissipating the energy. This path comprises a resistor 13 and a condenser 14. The critically damped path 12 is so proportioned that the resistance of the same is equal to two times the square root of the inductance divided by the capacitance. The action of such a damped path will be apparent, since it is understood by those versed in the art that the kinetic energy that tends to traverse the condenser 6 is permitted to traverse the main circuit through the path 12 and is dissipated after one oscillation when the value of the resistance satisfies the above-mentioned conditions.

In Fig. 2, the direct-current generator 1 supplies current to a load 2 through the conductors 3 and 4. The mercury-vapor device 5 is connected in series with the conductor 3, as is also the winding 15 of a relay 16. The condenser 6 and reactor 7 are connected from the conductor 3 to the movable member 17 of the relay 16. The movable member 17 has two contact members 18 and 19 mounted thereon. The contact member 19 is adapted to engage a stationary contact member 20 that is permanently connected to the conductor 3, and the contact member 18 is adapted to normally engage a stationary contact member 21 that is permanently connected to the conductor 4. A critically damped path 12 is connected in shunt relation to the mercury-vapor device 5, substantially as set forth with respect to Fig. 1 of the drawings.

When a short circuit occurs upon the system, the condenser 6 discharges through the circuit and also through the mercury-vapor device 5 to extinguish the arc in the mercury-vapor device and thereby interrupt the circuit. If a gradually increasing overload occurs upon the circuit, the relay 16 will be energized, at a predetermined load, to disengage the contact members 18 and 21 and to effect engagement of the contact members 19 and 20, thus connecting the condenser 6 and the reactor 7 in shunt relation to the mercury-vapor device 5. The condenser 6 will discharge, when so connected, to cause a local oscillation through the mercury-vapor device 5 only. This oscillation will reduce the current traversing the arc to such a value that it will be extinguished, and the circuit will be interrupted. The critically damped path 12 will permit the energy from the generator 1 to traverse the circuit for a period of one oscillation and then it will gradually be dissipated.

My invention is not limited to any specific structure or to the arrangement of the circuits illustrated, and I desire, therefore, that only such limitations shall be imposed as are indicated by the appended claims.

I claim as my invention:

1. In an electrical circuit, the combination with a vacuum-electric apparatus and means for impressing an oscillating voltage upon the said apparatus when the current traversing the circuit exceeds a predetermined value, of a path connected in shunt relation to the vacuum-electric apparatus to constitute a critically damped circuit therewith under normal conditions of operation.

2. In an electrical circuit, the combination with a vacuum-electric apparatus and means for impressing an oscillating voltage upon the said apparatus when the current traversing the same exceeds a predetermined value, of a normally critically damped path connected in shunt relation to the vacuum-electric apparatus for dissipating the kinetic energy of the circuit when the arc in the vacuum-electric apparatus is interrupted.

3. In an electrical circuit, the combination with a vacuum-electric apparatus and a condenser for impressing an oscillating voltage upon the said vacuum-electric apparatus when the current traversing the same exceeds a predetermined value, of a critically damped path connected in shunt relation to the vacuum-electric apparatus for dissipating the energy of the circuit when the vacuum-electric apparatus is inoperative.

4. In an electrical circuit, the combination with a mercury-vapor device connected in series with the circuit and means for impressing an oscillating voltage upon the said mercury-vapor device when the current traversing the same exceeds a pretermined value, of means connected in shunt relation to the said mercury-vapor device that is not adapted to normally affect the operation of the same and to effectively dissipate the energy of the circuit when the mercury-vapor device is inoperative.

5. In an electric circuit, the combination with an asymmetric resistor connected in series relation to the circuit, a condenser connected in shunt relation to the circuit, and a critically damped path connected in shunt relation to the asymmetric resistor.

6. In an electrical circuit, the combination with a mercury-vapor device connected in series with the circuit and electrical means connected in parallel relation to the circuit for inducing a high-frequency oscillating voltage in the circuit when the potential of the circuit changes quickly, of an electrical means connected in shunt relation to the mercury-vapor device and constituting a critically damped circuit therewith under normal conditions.

7. In an electrical circuit, the combination with a source of direct current, an electrical load, a mercury-vapor device, and means for extinguishing the arc of the mercury-vapor device when the voltage changes suddenly, of means for dissipating the energy of the source of direct current through the load and for precluding the rise of voltage across the mercury-vapor device to a relatively high value.

8. In an electrical circuit, the combination with a vapor valve connected in series with the circuit and a condenser connected in shunt relation to the circuit and adapted to discharge under predetermined conditions to set up a sufficiently high-potential ocillation to extinguish the arc of the vapor valve, of a critically damped circuit connected in shunt relation to the vapor valve to permit the dissipation of the energy of the circuit when the arc of the vapor valve is extinguished.

9. In an electrical circuit, the combination with a mercury-vapor device and a condenser for impressing an oscillating voltage upon the said mercury-vapor device under predetermined conditions to thereby interrupt the circuit, of a critically damped circuit connected in shunt relation to the mercury-vapor device to permit the dissipation of the energy of the circuit when the arc of the mercury-vapor device is extinguished.

10. In an electric circuit, the combination with a vacuum-electric apparatus connected in series relation to the circuit and a condenser connected in shunt relation to the circuit, of a critically damped path connected in shunt relation to the vacuum-electric apparatus.

In testimony whereof, I have hereunto subscribed my name this 26th day of June, 1915.

CHARLES LE G. FORTESCUE.